United States Patent Office 2,783,285
Patented Feb. 26, 1957

2,783,285
PROCESS OF CHLORINATING DIISOBUTYLENE

Robert R. Chambers and Robert L. Foster, Park Forest, Ill., assignors to Sinclair Refining Company, New York, N. Y., a corporation of Maine No Drawing. Application March 3, 1953,
Serial No. 340,152

2 Claims. (Cl. 260—654)

This invention relates to the chlorination of diisobutylene and more specifically it is concerned with the liquid phase chlorination of diisobutylene to yield a product composed principally of unsaturated monochlorides formed by substitution.

Diisobutylene may be obtained by dimerization of isobutylene under acidic conditions, e. g. by running isobutylene into sulfuric acid and heating the resulting solution to separate diisobutylene as an oil phase.

Commonly, diisobutylene is described as consisting mainly of two isomers which are 2,4,4-trimethylpentene-1 (2,4,4-TMP-1) and 2,4,4-trimethylpentene-2 (2,4,4-TMP-2). Usually about 80% of 2,4,4-TMP-1 and about 20% of 2,4,4-TMP-2 are present in commercially available diisobutylene although the amount of each isomer may be varied in the present invention until the material treated is substantially pure 2,4,4-TMP-1 or 2,4,4-TMP-2. Our invention is concerned with the substitution chlorination of diisobutylene or its separate isomers in the liquid phase to give as the principal product the allylic monochlorides of diisobutylene. The crude chlorination product consists mainly of unchlorinated diisobutylene, mixed monochlorides, and dichlorides. These products may be separated by distillation into three main fractions, namely diisobutylene, diisobutylene monochlorides, and the higher chlorides of diisobutylene. The monochloride fraction may be separated by distillation but in the presence of hydrochloric acid at distillation temperatures the unsaturated chloride is apparently oxidized, producing highly colored material in the distillate. Formation of this undesirable color may be prevented by removing the hydrochloric acid from the mixture before distillation by washing it with water or by blowing it with nitrogen at a moderate or low temperature. The chlorinated products formed in our process may be used as chemical intermediates in the production of various products, for instance, they may be hydrolyzed to yield alcohols as described in application Serial No. 347,222, filed April 7, 1953.

Structures of the three unsaturated monochloride isomers which result from the present chlorination of diisobutylene are as follows:

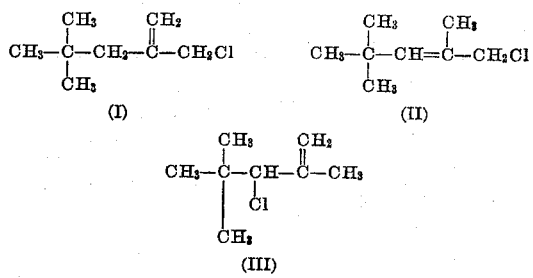

The unsaturated monochloride fraction obtained by our chlorination of diisobutylene contains at least two of the above three isomers. The presence of the two types of chlorides is indicated by the break in the hydrolysis curve of the chlorinated product as disclosed in the application mentioned above. In this application the chloride which hydrolyzes rapidly in an aqueous medium is assigned the secondary chloride structure (III).

By-products which might be obtained in chlorination of diisobutylene include the saturated tertiary monochloride formed by the addition of hydrogen chloride to diisobutylene, the saturated dichloride produced by the addition of chlorine to diisobutylene, and the unsaturated dichloride resulting from di-substitution of diisobutylene. Smaller amounts of higher chlorinated products may also be produced. These by-products are all less desirable than the allylic monochlorides because they are less reactive in substitution reaction or are difunctional. Our chlorination process gives unexpectedly small amounts of these potential by-products.

In the present invention we have found that the liquid phase substitution chlorination reaction should be effected while maintaining an intermediate reaction temperature which may be described as ranging from that necessary to drive off the hydrogen chloride substantially as formed during the reaction to temperatures slightly below the reflux temperature of the reacting mixture. For instance, this temperature may range from about 75° C. to just below the reflux temperature of the reacting mixture, that is, up to but not including the reflux temperature. The reflux temperature varies from the boiling point of diisobutylene at the beginning of the reaction to the boiling point of the partially chlorinated reaction mixture formed as the reaction proceeds. This temperature will rise as high as 145° C. or higher as the degree of chlorination advances during the reaction. Preferably, the temperature of our reacting mixture is maintained from about 90° to 110° C. During the chlorination the hydrogen chloride evolved must be removed from contact with the reacting mixture substantially as formed.

The reasons for maintaining our intermediate reaction temperature will be noted in detail below, and at present it suffices to say that at low temperatures the reaction mixture retains the hydrogen chloride formed which results in a disubstitution reaction with the formation of excessive unsaturated dichloride, while at reflux temperatures the chlorination rate is too slow to be practical in an economic sense. The addition of hydrogen chloride to diisobutylene forms a saturated chloride which does not undergo chlorine substitution at the low reaction temperature which might be utilized. It follows that in chlorination at low temperatures addition of hydrogen chloride to part of the olefin prevents it from participating in the chlorination which results in over-chlorination of the remaining olefin. Therefore, in order to obtain a satisfactory amount of unsaturated monochloride product at a chlorination rate which is fast enough to make the process economically feasible, our chlorination reaction should be effected while maintaining an intermediate reaction temperature.

Identification of the individual unsaturated monochlorides resulting from the present chlorination is complicated by the great facility with which rearrangement occurs during the reaction to form derivatives. The chlorides themselves are quite stable and do not rearrange in the absence of a catalyst. It has also been found that the monochloride isomers are difficult to separate by fractional distillation. For instance, two distillations were made at reflux ratios of 50:1 and 75:1 in a glass helices packed column of about fifteen plates and the failure of fractionation was shown by the constant refractive index throughout the distillation. The constant refractive index was unusual since the original mixture contained about equal amounts of primary and secondary chlorides having different indices and some indication of separation by change of refractive index was expected even if the pure isomers were not obtained.

Since the unsaturated monochloride isomers have not been separated, samples of the two pure olefins occurring in diisobutylene were chlorinated to provide some idea regarding the properties of the chlorides in the mixture. Pure 2,4,4-TMP-2 gave almost entirely the rapidly hydrolyzing secondary monochloride, while the 2,4,4-TMP-1 gave only a small amount of this chloride as is noted in the above-identified copending application. The properties of the chlorides obtained from the pure isomers and from the reaction mixture of the present invention are shown in the table below.

TABLE I

*Properties of chlorides*

|  | From 2,4,4,-TMP-1 | From 2,4,4,-TMP-2 | From DIB |
|---|---|---|---|
| B. P. | 155.5–157.5 | 151–155.5 | 151–158 |
| $n_D^{20}$ | 1.4463 | 1.4505 | 1.4471–1.4478 |
| Sp. Gr. 60/60 | 0.8065 | 0.9095 | 0.9060–0.9064 |

Infrared analysis of 2,4,4-TMP-2 chloride shows a terminal double bond and C—Cl absorption bands at 14.6$\mu$ and 17.65$\mu$. The spectrum of 2,4,4-TMP-1 chloride shows both internal and terminal double bonds, and the peaks at 14.6$\mu$ and 17.65$\mu$ for this chloride were small but a strong C—Cl absorption band appears at about 15.3$\mu$. By measuring the integrated intensity of the 14.6$\mu$ or 17.65$\mu$ peak the amount of rapidly hydrolyzing chloride can be determined. Measurement at the 17.65$\mu$ peak gives more reliable results. Since it is seen from the infrared spectra that the 14.6$\mu$ and 17.65$\mu$ peaks and the terminal double bond are associated with the rapidly hydrolyzing chloride, the structure of this chloride must be either (I) or (III) above. The position of the C—Cl peaks indicates that the chloride is secondary so the structure of the rapidly hydrolyzing chloride is then given by formula (III). This assignment fits in with the observed boiling points as the secondary chloride has the lower boiling point as expected (see Table 1 above).

In performing the chlorination reaction of our invention liquid diisobutylene may be placed in a suitable container equipped with a chlorine inlet, a mechanical stirrer, and means for measuring the reaction temperature. The chlorine inlet should be in the lower part of the container in order that the chlorine may be passed into the liquid beneath the surface of the diisobutylene. The temperature attained during the chlorination may be regulated by the rate of chlorination, but if necessary additional heat or cooling should be supplied to the reaction mixture in order to maintain the temperature within the limits specified above. The evolved hydrogen chloride is removed substantially as formed from contact with the reacting mixture by a suitable suction or other means.

Our chlorination may also be performed in a continuous reaction system. In such a system a flowing liquid stream of diisobutylene may be passed into a reaction zone with the gaseous chlorine being added to the liquid just before it enters this zone. Alternatively, the chlorine may be passed directly into the diisobutylene while in the reaction zone. The reaction products are continuously removed from the reaction zone followed by separation, e. g. by fractionation of the chlorinated product with the unreacted diisobutylene being recycled to the stream passing into the reaction zone. Temperatures in the continuous reaction system may be regulated as in the batch chlorination process described above and evolved hydrogen chloride is removed substantially as formed from contact with the reacting mixture.

As a specific example illustrating the effectiveness of our reaction conditions, we have taken 500 grams of liquid diisobutylene and placed them in a suitable flask equipped with a stirrer. Gaseous chlorine was passed into the liquid beneath its surface for 2.25 hours and the maximum reaction temperature reached during this time was 94° C. and was effected by the rate of chlorination without external heating or cooling. The rate of chlorination measured in the moles of chlorine reacted per hour was 1.72, while the diisobutylene was 88% converted to chlorinated products. The yield of unsaturated monochlorides was 93% based upon the weight of the total chlorinated product and 75% upon the weight of the diisobutylene feed. The molar ratio of diisobutylene to unsaturated monochlorides to dichlorides in the reaction product was 15:78:6.

In a similar reaction where the maximum temperature reached was only 46° C. and which was carried on for 14.75 hours and to 84% conversion of the diisobutylene, the yield of unsaturated monochloride was 81% based on the weight of the total chlorinated product (33% based on the diisobutylene feed). During this reaction the rate of chlorination was 0.14 mole of chlorine per hour. The product obtained in terms of molar ratio of diisobutylene to unsaturated monochlorides to dichlorides was 58:34:8.

Table II below includes data from the liquid phase chlorination of diisobutylene at the temperature within our intermediate range (94° C.) and from the chlorination at the temperature below this range (46° C.).

TABLE II

*Liquid phase chlorination*

| Run | Max. temp., degrees | Percent conversion [1] | Mole percent unsaturated monochloride | Mole percent unsaturated dichloride [2] |
|---|---|---|---|---|
| 1 | 94 | 88 | 75 | 7 |
| 2 | 46 | 84 | 33 | 19 |

[1] Calculated as substitution from weight gain.
[2] Based on total chlorinated product.

In Table II the monochloride and dichloride accounted for 87% of the conversion in run 1 but only 49% in run 2. The remaining 35% in run 2 was made up by hydrogen chloride addition products. Therefore, at the temperature utilized in run 1 hydrogen chloride addition was prevented, while at the lower temperature considerable hydrogen chloride added and produced as a consequence a larger amount of unsaturated dichloride and saturated tertiary monochloride, the latter being converted to diisobutylene upon distillation of the chlorinated product. The yield, based on the total chlorinated product, of unsaturated dichlorides by-product in the reaction at 46° C. is more than twice that obtained in the reaction in which the maximum temperature is 94° C. Thus, the effectiveness of my intermediate temperatures when compared with lower temperatures is clearly shown.

In the following table, data collected in several chlorinations are listed. In each of these reactions chlorine was bubbled into stirred diisobutylene kept at 0° C. to −10° C. The rate of these chlorinations was quite rapid but the evolution of hydrogen chloride was comparatively small. The amount of chlorination was measured by the increase in weight of the reacting mixture and, after chlorination, nitrogen was passed through the liquid while heating at reflux temperature for several hours and considerable hydrogen chloride was evolved. The evolution of this hydrogen chloride indicates that at these low reaction temperatures it does not pass from the reaction mixture and results in the formation of saturated tertiary chloride by addition reaction. Part of the diisobutylene is thus removed from the reaction resulting in overchlorination of the remainder of the diisobutylene.

TABLE III

Chlorination at 0° to —10° C.

| Run | Feed stock | Time of reaction | Percent Conversion—includes addition products formed | Rate of chlorination, moles Cl₂ per hour | Yield of Unsaturated monochloride | Molar ratio, DIB:Mono:Di |
|---|---|---|---|---|---|---|
| 1 | DIB 1,000 gm | 7 hrs | 110 | 1.40 | [1] 3% (0.2%) | 34:2:33 trichloride 14, tetrachloride 10, pentachloride 5, hexachloride 2. |
| 2 | DIB 1,000 gm | 2 hrs | 68 | 3.03 | [1] 67% (43%) | 31:46:23. |
| 3 | DIB 1,000 gm | 1 hr. 25 min. | 82 | 5.14 | [1] 46% (35%) | 19:38:43. |

[1] Yield based on weight of total chlorinated product. Yield in parentheses based on the weight of the diisobutylene feed.

From the above chlorinations it is seen that low temperature chlorinations show a sharp increase in dichloride formation at higher conversions when compared with intermediate temperature chlorinations.

In run 1 of Table III the conversion was taken to above 100% and from this chlorination 34% of the diisobtuylene was recovered. Very little monochloride was present but distillation fractions corresponding to polychlorides up to hexachloride were obtained. This result shows selective chlorination of the monochloride in the presence of diisobutylene and may be explained by the addition of the hydrogen chloride formed in the reaction to produce the saturated tertiary monochloride. This saturated chloride is more resistant to chlorination than corresponding unsaturated chlorides which were therefore chlorinated preferentially during the reaction. Upon distillation of the reaction mixture this unstable tertiary chloride decomposed regenerating diisobutylene. Thus, this explanation may be advanced for the high formation of dichlorides and the presence of large amounts of unreacted diisobutylene after product distillation when lower chlorination temperatures are used.

In order to illustrate further the effectiveness of our substitution chlorination reaction at intermediate temperatures, we have made several runs of a similar chlorination reaction effected under reflux temperature. In these reactions chlorine was bubbled into stirred refluxing diisobutylene which was heated to reflux in a three-necked flask fitted with a reflux condenser. The flask had a chlorine inlet below the surface of the liquid and was equipped with a mechanical stirrer and a thermowell. During the reaction chlorine was passed beneath the surface of the liquid while it was being stirred and refluxed. The temperature rose slowly during chlorination and the chlorination was stopped when the temperature reached the desired point, that is, from 135° to 145° C. Very little volume change occurred during chlorination and the amount of chlorination was measured by the rise in reflux temperature. The results of these chlorinations are noted in Table IV.

TABLE IV

Chlorination at reflux temperature

| Run | DIB Feed, gm. | Time of reaction | Maximum reaction temperature, °C. | Percent conversion | Rate of chlorination, moles Cl₂ per hour | Yield of unsaturated monochloride | Molar ratio, DIB:Mono:Di |
|---|---|---|---|---|---|---|---|
| 1 | 750 | 12 hrs | 135 | 73 | 0.41 | [1] 91% (60%) | 24:69:7 |
| 2 | 1,000 | 11 hrs. 55 min | 145 | 97 | 0.72 | [1] 82% (68%) | 6:77:17 |
| 3 | 500 | 4 hrs | 138 | 86 | 0.96 | [1] 91% (71%) | 22:71:7 |

[1] Yield based on weight of total chlorinated product. Yield in parentheses based on the weight of the diisobutylene feed.

It is seen that the rate of chlorination of the runs of Table IV is considerably slower than that attained in the chlorination of the present invention which utilizes intermediate temperatures. These rates of chlorination, except in run 3 of Table IV, were determined while adding chlorine as rapidly as possible without giving rise to the presence of chlorine in the exit gases. In run 3 of Table IV the chlorine input was adjusted so that chlorine escaped from the reaction and yet the rate of chlorination was only 0.96 mole per hour which fails to compare favorably with the rate of chlorination of 1.72 attained in our reaction using an intermediate temperature of 94° C. noted above. Thus, it is seen that the substitution chlorination of diisobutylene at intermediate temperature may be advantageously effected at a more rapid rate than is possible when utilizing reflux temperature.

Under certain conditions it might be advantageous to selectively chlorinate diisobutylene in order that the reaction product would contain greater quantities of either the primary or secondary isomer. In general, it may be said that selective chlorination of diisobutylene in the liquid phase to give the secondary unsaturated monochloride is greatest at low conversion rates. Nitrogen dilution of the gaseous chlorine may also affect the reaction in a manner to produce more secondary chloride. The presence of only one chloride isomer in the reaction product is not of greatest importance in the production of primary alcohols from the chlorides since this alcohol is obtained from both the primary and secondary chloride isomers as noted in the above-identified application. High concentrations of one isomer may be useful, however, in preparing other compounds.

We claim:

1. A process of chlorinating 2,4,4-trimethylpentene-2 to yield $$CH_3-\underset{\underset{CH_3}{|}}{\overset{\overset{CH_3}{|}}{C}}-CH-\overset{\overset{CH_2}{\|}}{C}-CH_3$$
$$\phantom{CH_3-C-}\underset{}{Cl}$$

which comprises contacting liquid 2,4,4-trimethylpentene-2 with chlorine while maintaining the temperature of the reacting mixture from about 90° C. to about 110°

C., and removing from the reacting mixture substantially as it is formed the hydrogen chloride evolved during the reaction.

2. The method of claim 1 in which the 2,4,4-trimethylpentene-2 is in admixture with 2,4,4-trimethylpentene-1.

References Cited in the file of this patent

UNITED STATES PATENTS

| 2,380,500 | Buc et al. | July 31, 1945 |
| 2,667,508 | Towle | Jan. 26, 1954 |